US011444651B2

(12) United States Patent
Posselt et al.

(10) Patent No.: US 11,444,651 B2
(45) Date of Patent: Sep. 13, 2022

(54) TRANSCEIVER, VEHICLE, METHOD, AND COMPUTER PROGRAM FOR A TRANSCEIVER

(71) Applicant: Bayerisch Motoren Werke Aktiengesellschaft, Munich (DE)

(72) Inventors: Adrian Posselt, Munich (DE); Christian Arendt, Munich (DE); Peter Fertl, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 426 days.

(21) Appl. No.: 15/845,790

(22) Filed: Dec. 18, 2017

(65) Prior Publication Data
US 2018/0123632 A1    May 3, 2018

Related U.S. Application Data

(63) Continuation of application No. PCT/EP2016/059854, filed on May 3, 2016.

(30) Foreign Application Priority Data

Jun. 19, 2015   (DE) ...................... 10 2015 211 336.1

(51) Int. Cl.
*H04B 1/40* (2015.01)
*H04B 7/06* (2006.01)
(Continued)

(52) U.S. Cl.
CPC ............... *H04B 1/40* (2013.01); *H04B 1/082* (2013.01); *H04B 1/1027* (2013.01);
(Continued)

(58) Field of Classification Search
USPC ...................................................... 455/562.1
See application file for complete search history.

(56) References Cited

U.S. PATENT DOCUMENTS 6,236,372 B1 * 5/2001 Lindenmeier ........ H01Q 1/1271
343/704
6,744,823 B1 * 6/2004 Kamemura ............ G08G 1/094
375/267

(Continued)

FOREIGN PATENT DOCUMENTS

CN        102811083 A  * 12/2012
CN        102811083 A    12/2012
(Continued)

OTHER PUBLICATIONS

Jinxin Hou et al., CN102811083 Translation, Dec. 5, 2012 (Year: 2012).*

(Continued)

*Primary Examiner* — Zhitong Chen
(74) *Attorney, Agent, or Firm* — Crowell & Moring LLP

(57) ABSTRACT

A transceiver for a vehicle for communication in a mobile radio system includes one or more interfaces for a plurality of antennas, and a transceiving device configured to communicate via the one or more interfaces and via at least a part of the plurality of antennas in the mobile radio system. The transceiver also includes a control device configured to control the transceiving device and the one or more interfaces, where the control device determines, via a first cluster of the plurality of antennas, information about a radio channel between the first cluster of antennas and a base station of the mobile radio system, and communicates via a second cluster of the plurality of antennas with the base station of the mobile radio system.

20 Claims, 5 Drawing Sheets

(51) Int. Cl.
  *H04B 7/10* (2017.01)
  *H04B 1/10* (2006.01)
  *H04B 1/08* (2006.01)
  *H04B 17/309* (2015.01)
  *H04W 88/08* (2009.01)

(52) U.S. Cl.
  CPC ......... *H04B 7/0617* (2013.01); *H04B 7/0691* (2013.01); *H04B 7/10* (2013.01); *H04B 17/309* (2015.01); *H04W 88/08* (2013.01)

(56) References Cited

U.S. PATENT DOCUMENTS

| | | | | |
|---|---|---|---|---|
| 7,546,146 | B2 * | 6/2009 | Sievenpiper | H04B 7/0814 370/334 |
| 8,315,617 | B2 * | 11/2012 | Tadayon | H04W 4/50 455/418 |
| 9,809,197 | B2 * | 11/2017 | Miyazawa | G07C 9/00309 |
| 2003/0193388 | A1 * | 10/2003 | Ghabra | B60R 25/24 340/5.61 |
| 2005/0113143 | A1 * | 5/2005 | Oiwa | H04B 7/082 455/562.1 |
| 2005/0131585 | A1 | 6/2005 | Luskin et al. | |
| 2005/0181755 | A1 * | 8/2005 | Hoshino | H04B 7/0871 455/272 |
| 2006/0132350 | A1 * | 6/2006 | Boltovets | G01S 7/032 342/70 |
| 2006/0186993 | A1 * | 8/2006 | Inoue | B60R 25/245 340/5.72 |
| 2007/0077896 | A1 * | 4/2007 | Ho | G07B 15/06 455/78 |
| 2008/0125129 | A1 * | 5/2008 | Lee | H04L 12/4641 455/440 |
| 2008/0254743 | A1 * | 10/2008 | Nishikawa | H04B 7/1555 455/24 |
| 2009/0140921 | A1 * | 6/2009 | Bongfeldt | H01Q 1/1242 342/372 |
| 2009/0189813 | A1 * | 7/2009 | Haas | G01S 11/026 342/384 |
| 2010/0009636 | A1 * | 1/2010 | Hasegawa | H04B 17/0042 455/67.11 |
| 2010/0198428 | A1 * | 8/2010 | Sultan | G07C 9/00309 701/2 |
| 2010/0234071 | A1 * | 9/2010 | Shabtay | H04B 7/0408 455/562.1 |
| 2010/0310005 | A1 * | 12/2010 | Takagi | H04B 7/061 375/295 |
| 2011/0105049 | A1 * | 5/2011 | Yamada | H04B 7/0697 455/68 |
| 2011/0130916 | A1 | 6/2011 | Mayer | |
| 2012/0320962 | A1 * | 12/2012 | Takai | H04B 7/082 375/227 |
| 2013/0021146 | A1 * | 1/2013 | Stegmaier | G08G 1/162 340/436 |
| 2014/0321582 | A1 | 10/2014 | Cheng et al. | |
| 2015/0180563 | A1 * | 6/2015 | Zhang | H04B 7/082 370/329 |
| 2016/0161942 | A1 * | 6/2016 | Linderer | G05B 24/02 318/600 |
| 2016/0174241 | A1 * | 6/2016 | Ansari | H04W 84/005 370/329 |
| 2016/0205461 | A1 * | 7/2016 | Fernandez-Medina | H04R 1/1091 381/74 |
| 2016/0316480 | A1 * | 10/2016 | Oh | H04B 7/0608 |
| 2016/0325766 | A1 * | 11/2016 | Tsujita | B61L 3/125 |
| 2017/0099686 | A1 * | 4/2017 | Green | H04L 27/0014 |
| 2018/0076839 | A1 * | 3/2018 | Baghel | H04W 76/20 |
| 2018/0138935 | A1 * | 5/2018 | Baek | H04B 1/3822 |
| 2018/0167784 | A1 * | 6/2018 | Sute | G01S 5/0284 |

FOREIGN PATENT DOCUMENTS

| | | |
|---|---|---|
| DE | 10 2012 006 369 A1 | 10/2012 |
| EP | 2 645 474 A1 | 10/2013 |

OTHER PUBLICATIONS

PCT/EP2016/059854, International Search Report dated Jul. 7, 2016 (Two (2) pages).

German Search Report issued in German counterpart application No. 10 2015 211 336.1 dated Feb. 8, 2016, with partial English translation (Twelve (12) pages).

Chinese Office Action issued in Chinese counterpart application No. 201380059217.3 dated Nov. 3, 2017 (Ten (10) pages).

Chinese Office Action issued in Chinese counterpart application No. 201680012649.2 dated Nov. 4, 2019, with English translation (Fifteen (15) pages).

* cited by examiner

TRANSCEIVER, VEHICLE, METHOD, AND COMPUTER PROGRAM FOR A TRANSCEIVER

CROSS REFERENCE TO RELATED APPLICATIONS

This application is a continuation of PCT International Application No. PCT/EP2016/059854, filed May 3, 2016, which claims priority under 35 U.S.C. § 119 from German Patent Application No. 10 2015 211 336.1, filed Jun. 19, 2015, the entire disclosures of which are herein expressly incorporated by reference.

BACKGROUND AND SUMMARY OF THE INVENTION

Illustrative embodiments deal with a transceiver, a vehicle, a method and a computer program for a transceiver, particularly, but not exclusively, with cooperative channel estimation by using a plurality of possibly distributed antennas at a vehicle.

Mobile radio systems, particularly on a cellular basis have existed already for several generations. The current network planning and also the further development of the cellular communication systems is essentially based on stationary base stations which provide wireless data and communication services in their respective coverage areas, the so-called cells. In addition, communication directly between the terminals (device-to-device communication) is also conceivable. In this context, mobile terminals are used for providing wireless services on the user side. For example, such mobile terminals are also used in vehicles. In the field of vehicles, other possibilities are obtained through the use of antenna systems than in the field of mobile telephones such as, e.g., cellphones, computers, are available.

Current vehicle antenna systems are designed for mobile connection to cellular mobile radio systems and broadcasting systems. To ensure that the required data rates and quality requirements are met, single antenna systems have mainly been used for networking vehicles. In the current generation of various vehicle derivatives, multi-antenna systems are also increasingly installed (so-called multiple-input-multiple-output (MIMO) systems). These are, e.g. two antennas which are mounted at a central location on the vehicle (centralized approach). Furthermore, multi-antenna concepts are found in the prior art which, for example, utilize receiving diversity of the signals received over a number of antennas. In addition, vehicles can have a number of antennas for different systems or services, e.g. broadcast receiving antennas, mobile radio antennas, antennas for navigation systems etc.

Illustrative embodiments of the present invention are based on the central idea of creating an alternative concept (possibly change of paradigm in the partitioning of the vehicle networking architecture) for using antennas at a vehicle. A vehicle often offers the possibility of mounting and utilizing a plurality of antennas, for example also at different locations. It is a central idea of illustrative embodiments to divide a plurality of possibly distributed antennas of a vehicle in clusters and using one cluster each for channel estimation and for communication or for the actual data exchange. Illustrative embodiments can thus utilize a relatively large number of antennas and thus draw advantages from the spatial distribution and possibly separation (decorrelation of the individual transmission paths) of the antennas.

Illustrative embodiments create a transceiver for a vehicle for communication in a mobile radio system. The transceiver comprises one or more interfaces for a plurality of antennas. The transceiver also has a transceiving device which is designed to communicate via the one or more interfaces and via at least a part of the plurality of antennas in the mobile radio system. The transceiver comprises a control device which is designed for controlling the transceiving device and the one or more interfaces. The control facility is also designed to determine via a first cluster of the plurality of antennas information about a radio channel between the first cluster of antennas and a base station of the mobile radio system and to communicate via a second cluster of the plurality of antennas with the base station of the mobile radio system. Illustrative embodiments can thus enable a plurality of antennas to be utilizable. Channel estimation and actual data communication can be carried out by a differ cluster of antennas.

In some illustrative embodiments the plurality of antennas can comprise two or more antennas of different orientation, different polarization, different mounting locations on the vehicle, different antenna gains or different radiation characteristics. Illustrative embodiments can thus render a plurality of different antennas usable so that corresponding diversity gains, beam shaping gains or multi-streaming gains can become achievable. For example, the multiplicity of antennas can correspond to an antenna system having decentralized, distributed antennas. In illustrative embodiments, the information about the radio channel can comprise information about at least one direction of incidence of radio signals, for example relative to the vehicle.

In further illustrative embodiments, the control facility can be designed for determining by means of the information about the radio channel between the first cluster of the antennas and the base station of the mobile radio system information about a radio channel between the second cluster of the antennas and the base station of the mobile radio system. At least some illustrative embodiments can in this way enable a prediction of the radio channel or a state of a radio channel of the second cluster, which is used for data communication, on the basis of a radio channel or a state of a radio channel of the first cluster for the channel estimation.

For example, the control facility can also be designed to take into consideration in the determination of the information about the radio channel between the second cluster of the antennas and the base station of the mobile radio system also a speed, availability information about the mobile radio system and/or a direction of travel of the vehicle. To this extent, some illustrative embodiments can provide for a channel prediction based on a state of movement of the vehicle or a network change predictable on the basis of the availability information. For example, the control facility can be designed to determine via the one or more interfaces information about the speed, the availability information about the mobile radio system and/or the direction of travel of the vehicle. In some illustrative embodiments, vehicle sensors or data of vehicle sensors or from data memories can thus be utilized for achieving an improved channel prediction.

The control facility can be designed in some illustrative embodiments to determine the information about the radio channel between the second cluster of the antennas and the base station of the mobile radio system on the basis of the assumption that at least one antenna of the first cluster of antennas is arranged in a direction of travel of the vehicle in front of at least one antenna of the second cluster, or that at least one antenna of the second cluster of antennas experiences the same radio channel as at least one antenna of the first cluster delayed in time. To this extent, a type of cooperative channel estimation can take place based on the expectation that the second cluster experiences the same radio channel conditions as the first cluster but slightly later in time. This can be achieved, for example, by the first cluster being arranged spatially in such a way that it reaches a particular location, due to the direction of movement of the vehicle, before the second cluster. The control facility can be designed to adaptively match a selection of antennas from the plurality of antennas for the first and the second cluster of antennas. To this extent, advantageous or profitable antennas can be determined and used or a selection of advantageous antennas can be adapted.

Accordingly, the control facility can also be designed to select the first cluster of antennas on the basis of a direction of travel of the vehicle in such a way that the first cluster is arranged in front of the second cluster in the direction of travel of the vehicle. To this extent, the selection of the antennas for the two clusters can be adapted to the direction of travel and the radio conditions in some illustrative embodiments. For example, the control facility can be designed to adaptively match a number of antennas in the first cluster and/or in the second cluster of antennas, e.g. on the basis of a radio channel estimated via the first cluster.

In further illustrative embodiments, the transceiving device can comprise two or more transceiving modules which are coupled to the antennas of the plurality of antennas. Some illustrative embodiments can thus allocate channel estimation and data communication possibly to separate transceiving modules. The control device can be designed to carry out beam forming with respect to the base station of the mobile radio system via the antennas in the second cluster. Some illustrative embodiments can thus apply signal processing concepts within the second cluster of antennas, which are associated with additional capacity or signed gain. The control device can be designed, for example, to adaptively match a beam forming via the antennas in the second cluster, e.g. in order to match the beam forming by means of the respective radio and interference situations.

Illustrative embodiments also provide a vehicle with an illustrative embodiment of the transceiver described above. The vehicle can then comprise the plurality of antennas. For example, the first cluster of antennas can comprise the same number of antennas as the second cluster of antennas. This can facilitate the channel estimation in illustrative embodiments since the same number of antennas were used for channel estimation and for data transmission. Furthermore, the antennas of the first cluster can have the same geometry with respect to one another as the antennas of the second cluster. In some illustrative embodiments, the channel estimation can thus be facilitated further for the second cluster since no adaptation is necessary on the basis of different geometries between the antennas in the clusters. In addition, the antennas of the first cluster can have the same antenna characteristic in some further illustrative embodiments as the antennas of the second cluster. In such illustrative embodiments, the estimation for the channel of the second cluster can be correspondingly simplified. The first cluster can comprise other antennas than the second cluster in illustrative embodiments.

Illustrative embodiments also provide a method for a transceiver for a vehicle for communication in a mobile radio system. The method comprises determining information about a radio channel between a first cluster of antennas of a plurality of antennas and a base station of the mobile radio system. The method also comprises communicating with the base station of the mobile radio system via a second cluster of the plurality of antennas.

Illustrative embodiments also provide a computer program for carrying out at least one of the methods described above when the computer program is run carried out on a computer, a processor or a programmable hardware component. Illustrative embodiments also provide a digital storage medium which is machine- or computer-readable and which has electronically readable control signals which can interact with a programmable hardware component in such a way that one of the methods described above is carried out.

Other objects, advantages and novel features of the present invention will become apparent from the following detailed description of one or more preferred embodiments when considered in conjunction with the accompanying drawings.

BRIEF DESCRIPTION OF THE DRAWINGS

Illustrative embodiments will be explained in greater detail in the text which follows, referring to the attached figures, in which.

DETAILED DESCRIPTION OF THE DRAWINGS

Figure 1:
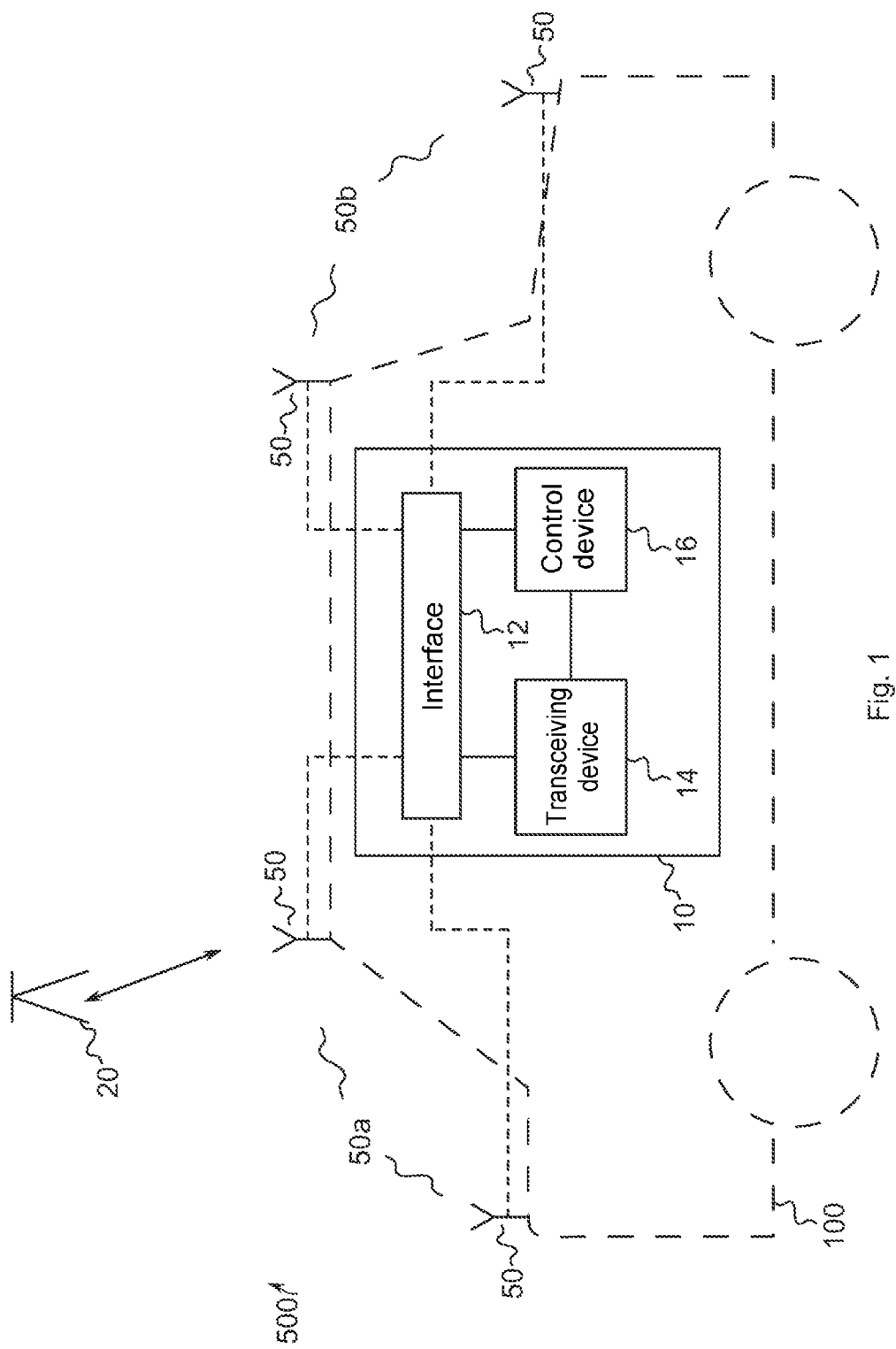
FIG. 1 shows an illustrative embodiment of a transceiver for a vehicle.

Various illustrative embodiments will now be described in greater detail, with reference to the attached drawings in which some illustrative embodiments are represented. In the figures, the dimensions of thicknesses of lines, layers and/or regions can be represented exaggerated for the sake of clarity.

In the following description of the attached figures, which only show a few exemplary illustrative embodiments, identical reference symbols can designate identical or comparable components. Furthermore, summarizing reference symbols can be used for components and objects which occur several times in an illustrative embodiment or in a drawing but are described jointly with regard to one or more features. Components or objects which are described with identical or summarizing reference symbols can be realized identically with regard to individual, several or all features, for example their dimensionings, but possibly also differently unless the description results explicitly or implicitly in something else.

Although illustrative embodiments can be modified and changed in different ways, illustrative embodiments are shown as examples in the figures and are described in detail in the present text. However, it should be explained that it is not intended to restrict illustrative embodiments to the forms disclosed in each case but that illustrative embodiments, instead, are intended to cover all functional and/or structural modifications, equivalents and alternatives which are within the range of the invention. Identical reference symbols designate identical or similar elements in the entire description of figures.

It should be noted that an element which is designated as "connected" or "coupled" to another element can be connected or coupled directly to the other element or that there can be interposed elements present. If, in contrast, an element is designated as "connected directly" or "coupled directly" to another element, there are no interposed elements present. Other terms which are used for describing the relation between elements should be interpreted in a similar way (e.g. "between" compared with "directly between", "adjacent" compared with "directly adjacent", etc.).

The terminology which is used in the present text is only used for describing certain illustrative embodiments and is not intended to restrict the illustrative embodiments. As they are used in the present text, the singular forms "a", "an", "of an" and "the", should also include the plural forms unless the context unambiguously specifies something else. Furthermore, it should be explained that the expressions such as, e.g., "contains", "containing", "has", "comprises", "comprising" and/or "having", as used herein, specifies the presence of features mentioned, integral numbers, steps, operating sequences, elements and/or components but do not exclude the presence or the addition of one or more features, integrals, steps, operating sequences, elements, components and/or groups therefrom.

Unless otherwise defined, all terms used herein (including chemical and scientific terms) have the same meaning which is attributed to them by an average expert in the field to which the illustrative embodiments belong. Furthermore, it should be explained that expressions, e.g. those which are defined in generally used dictionaries are to be interpreted in such a way as if they had the meaning which is consistent with their meaning in the context of the relevant technology and should not be interpreted in an idealized or excessively formal sense unless this is defined expressively herein.

Illustrative embodiments can use concepts for channel estimation which utilize at least one estimation and one receiving antenna and which are aimed at optimizing or improving the message transmission in the driving operation. Under certain circumstances, multiple estimating antennas arranged behind one another and in the direction of driving are also used here. Illustrative embodiments can then utilize decentralized or distributed antenna systems which provide for a cooperative channel estimation between the spatially separate antennas.

FIG. 1 shows an illustrative embodiment of a transceiver 10 for a vehicle 100 for communication in a mobile radio system 500. Here and in the text which follows, the term vehicle is understood to be, for example, a motor vehicle, a car, a bus, a train, an aircraft, a ship, a two-wheeled vehicle etc. In this context, the transceiver 10 can be designed as a unit, e.g. as an electric circuit or module, overall which is adapted to use in a vehicle. In some illustrative embodiments, the transceiver can also be integrated into other components, e.g. in a linking transceiver which, together with a base station transceiver, forms a mobile relay transceiver for the vehicle 100. As is shown by FIG. 1 by means of the dashed lines, illustrative embodiments also produce a vehicle 100 which comprises the transceiver 10.

In illustrative embodiments, the mobile radio system 500 can correspond, for example, to one of the mobile radio systems which are standardized by corresponding standardization organizations such as, e.g., the third generation partnership project (3GPP) group. For example, these comprise the Global System for Mobile Communication (GSM), Enhanced Data Rates for GSM Evolution (EDGE), GSM EDGE Radio Access Network (GERAN), the Universal Terrestrial Radio Access Network (UTRAN) or the Evolved UTRAN (E-UTRAN) such as, e.g., the Universal Mobile Telecommunication System (UMTS), Long Term Evolution (LTE) or LTE-Advanced (LTE-A), or also mobile radio systems of other standards such as, e.g., the Worldwide Interoperability for Microwave Access (WIMAX), IEEE802.16 or Wireless Local Area Network (WLAN), IEEE802.11, and generally a system which is based on a "Time Division Multiple Access (TDMA)" method, "Frequency Division Multiple Access (FDMA)" method, "Code Division Multiple Access (CDMA)" method, "Orthogonal Frequency Division Multiple Access (OFDMA)" method or another technology or multiple access method. In the text which follows, the terms mobile radio system and mobile radio network are used synonymously.

In the text which follows it is assumed such a mobile radio system 500 comprises at least a stationary transceiver in the sense of a base station 20 which has linkage to the line-connected part of the mobile radio network. On the other side, it is assumed that the radio network comprises at least one mobile transceiver 10 (mobile radio terminal), the term mobile being intended to relate to the fact that communication with this transceiver takes place via the air interface e.g. cableless/cordless. Such a mobile transceiver can correspond, for example, to a portable telephone, a smartphone, a tablet computer, a portable computer or a radio module which is not mandatorily mobile in the sense that it is actually moving through its environment. The transceiver can also be stationary (e.g. relative to a motor vehicle), but can communicate wirelessly with the mobile radio network. To this extent, the base station already mentioned can correspond to a base station of one of the above-mentioned standards, for example a NodeB, an eNodeB, etc.

A base station transceiver or a base station (these terms can be used equivalently) can be designed for communicating with one or more active mobile radio devices and for communicating in or adjacently to a supply area of another base station transceiver or a base station, e.g. as macrocell base station or as microcell base station. Thus, embodiments can comprise a mobile communication system having one or more mobile radio terminals and one or more base stations, wherein the base station transceivers can provide macrocells or microcells, e.g. picocells, metrocells or femtocells. A mobile transceiver or mobile radio terminal can correspond to a smartphone (intelligent telephone), a portable phone, a user device, a radio device, a mobile device, a mobile station, a laptop, a notebook, a personal computer (PC), a personal digital assistant (PDA), a Universal Serial Bus (USB) stick or adapter, a car, etc. A mobile transceiver can also be designated as user equipment (UE) or mobile in conformity with the 3GPP terminology.

A base station transceiver or a base station can be located, at least as viewed from a mobile radio terminal, in a fixed or at least permanently connected part of the network or system. A base station transceiver or a base station can also correspond to a remote radio head, a relay station, a transmission point, an access point, a radio device, a macrocell, a microcell, a femtocell, a metrocell etc. A base station or a base station transceiver is thus understood to be a logical concept of a node/a unit for providing a radio carrier or radio links via the air interface via which access to a mobile radio network is produced for a terminal/mobile transceiver.

A base station or a base station transceiver can represent a wireless interface for mobile radio terminals to a wired network. The radio signals used can be radio signals standardized by 3GPP or generally radio signals in correspondence with one or more of the above-mentioned systems. Thus, a base station or a base station transceiver can correspond to a NodeB, an eNodeB, a base transceiver station (BTS), an access point, a remote radio head, a transfer point, a relay station etc. which can be subdivided into further functional units.

A mobile radio terminal or mobile transceiver can be allocated to a base station or cell or registered at the latter. The term cell relates to a coverage area of the radio services which are provided by a base station, e.g. by a NodeB (NB), an eNodeB (eNB), a remote radio head, a transfer point, a relay station, etc. A base station can represent one or more cells on one or more carrier frequencies. In some illustrative embodiments, a cell can also correspond to a sector. For example, sectors can be formed with sector antennas which are formed for covering an angular section around an antenna location. In some illustrative embodiments, a base station can be designed, for example, for operating three or six cells or sectors (e.g. 120° in the case of three cells and 60° in the case of six cells). A base station can comprise a number of sector antennas. In the text which follows, the term cell and base station can also be used synonymously.

In other words the mobile communication system can also comprise in the embodiments a heterogeneous network of cells (HetNet) which has different cell types, (e.g. cells with close subscriber groups (CSG) and open cells and cells of different size such as, e.g. macrocells and microcells, the coverage area of the microcell being smaller than the coverage area of a macrocell. A small cell can correspond to a metrocell, a microcell, a picocell, a femtocell etc. The coverage areas of the individual cells are provided by the base stations for their supply areas and depend on the transmitting powers of the base stations and the interference conditions in the respective area. In some embodiments, a coverage area of a small cell can be surrounded at least partially by a supply area of another cell or partially correspond with or overlap a supply area of, e.g., a macrocell. Small cells can be used in order to widen the capacity of the network. A metrocell can be used, therefore, for covering a smaller area than a macrocell, e.g. metrocells are used for covering a road or a section in a conurbation. For a macrocell, the coverage area can have a diameter of the order of magnitude of 1 kilometer or more, for a microcell, the coverage area can have a diameter of less than 1 kilometer and a picocell can have a coverage area having a diameter of less than 100 m. A femtocell can have the smallest coverage area and can be used for covering, for example, a domestic area, a motor vehicle area or a gate area at the airport, i.e. its transmitting area can have a diameter of less than 50 m.

FIG. 1 also shows that the transceiver 10 has one or more interfaces 12 which are designed for communicating with a plurality of antennas 50. The plurality of antennas is shown with four antenna symbols in FIG. 1 and can also comprise more or fewer antennas in illustrative embodiments, for example two or more antennas. A single antenna or a single antenna element can then have different form, shape and properties. For example, dipole antennas, patch antennas, planar array antennas, antenna arrays, magnetic antennas etc. and their elements can be used.

In illustrative embodiments, the one or more interfaces 12 can be designed as arbitrary interfaces which are suitable for such a communication. In this case, arbitrary implementations are conceivable here which allow the exchange of data or control contents, radio signals, radio-frequency signals between the plurality of antennas and a transceiving device 14 which will still be explained in greater detail in the text which follows. For example, arbitrary serial or also parallel, analog and digital interfaces are conceivable. In some illustrative embodiments, the radio signals can be formed only in the immediate vicinity of the respective antennas or antenna elements. In consequence, the antennas can also comprise corresponding amplifiers, converters, mixers, remote radio heads (RRHs) etc. To this extent, baseband data can also be communicated in digital or discrete form via the one or more interfaces 12. In illustrative embodiments, the transceiving device 12 can comprise two or more transceiving modules, e.g. RRHs which are coupled to the plurality of antennas 50 and/or the clusters 50a, 50b.

As shown in FIG. 1, the illustrative embodiment of the transceiver 10 comprises a transceiving device 14 which is designed to communicate via the one or more interfaces 12 and via at least a part of the plurality of antennas of antennas 50 in the mobile radio system 500. The transceiving device 14 is coupled to the one or more interfaces 12. In illustrative embodiments, the transceiving device 14 can contain typical transmitter and receiver components. This can include, for example, one or more filters, one or more mixers, one or more amplifiers, one or more diplexers, one or more duplexers etc. Depending on implementation, the aforementioned components can be configured in the transceiving device 14 or else in or with the antennas 50.

As is further shown in FIG. 1, the transceiver 10 further comprises a control device 16 which is designed for controlling the transceiving device and the one or more interfaces 12. The control device 16 is coupled to the transceiving device 14 and the one or more interfaces 14. The control device 16 is also designed to determine via a first cluster 50a of the plurality of antennas 50 information about a radio channel between the first cluster 50a and a base station 20 of the mobile radio system 500. The control device 16 is also designed to communicate via a second cluster 50b of the plurality of antennas 50 with the base station 20 of the mobile radio system 500. The first or the second cluster 50a, 50b can comprise one or more antennas of the plurality of antennas 50.

In illustrative embodiments, the control device 16 can correspond to an arbitrary controller or processor or a programmable hardware component. For example, the control device 16 can also be implemented as software which is programmed for a corresponding hardware component. To this extent, the control device 16 can be implemented as programmable hardware with correspondingly adapted software. In this context, arbitrary processors such as digital signal processors (DSPs) can be used. In this context, illustrative embodiments are not restricted to a particular type of processor. Any processors or also a number of processors are conceivable for implementing the control device 16.

Although the illustrative embodiment illustrated in FIG. 1 shows the plurality of antennas with the same symbols, the individual antennas of the plurality of antennas 50 can differ. For example, antennas of different orientation, different polarization, different mounting locations of the vehicle 100, different antenna gain or different radiation characteristics can be comprised in the plurality of antennas 50. The plurality of antennas 50 can correspond to an antenna system having decentralized and/or distributed antennas. In this context, the structure or the form of the vehicle 100 can be utilized for mounting the antennas at different locations on the vehicle 100 and to align them differently. Illustrative embodiments can thus utilize, for example, the diversity of the antennas since these may be able to offer independent or different receiving and/or transmitting characteristics due to the different mounting locations, orientation, polarization etc.

Some illustrative embodiments can also utilize beam forming concepts and, in doing so, drive a number of antennas in such a way that their radio signals become selectively superimposed for particular spatial directions constructively (e.g. in the direction of the base station) or also destructively (e.g. for spatially removing an interference source). The control device 16 can be designed to carry out beam forming with respect to the base station 20 of the mobile radio system 500 at least via the antennas in the second cluster 50b. If necessary, a corresponding beam forming concept can also be taken into consideration within the first cluster 50a in the determination of the information about the radio channel, for example in order to take into consideration identical beam forming gains within the clusters 50a and 50b. In some illustrative embodiments, the control device 16 can be designed to adaptively match beam forming via the antennas in the second cluster 50b, for example by so-called adaptive beam forming or adaptive beam switching, or other concepts in the field of so-called "intelligent antennas". In illustrative embodiments, the control device 16 can control the one or more interfaces 12 directly or also indirectly, for example via the transceiving device 14, e.g. in the sense of a switch, a switching matrix or also a multidiplexer and in this way in each case allocate or assign one or more antennas to the clusters 50a, 50b. In some illustrative embodiments, the control device 16 can correspondingly also process signals for individual antennas or clusters 50a, 50b, i.e. influence, combine, filter etc. them, for example, in amount and phase.

Figure 2:
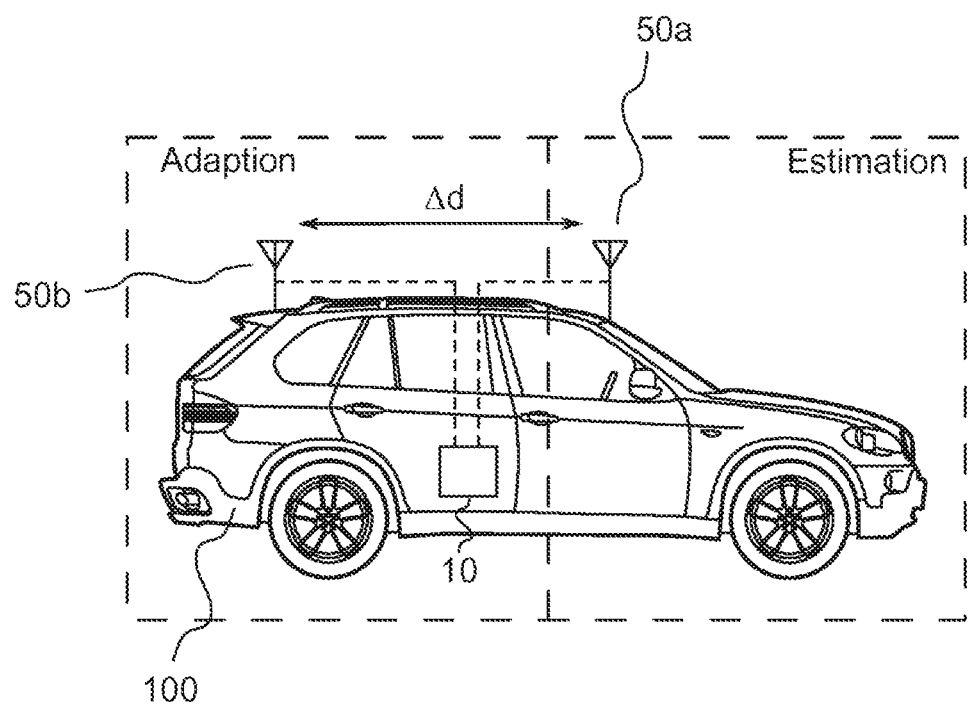
FIG. 2 shows an illustrative embodiment of a vehicle, comprising an illustrative embodiment of a transceiver.
Figure 3:
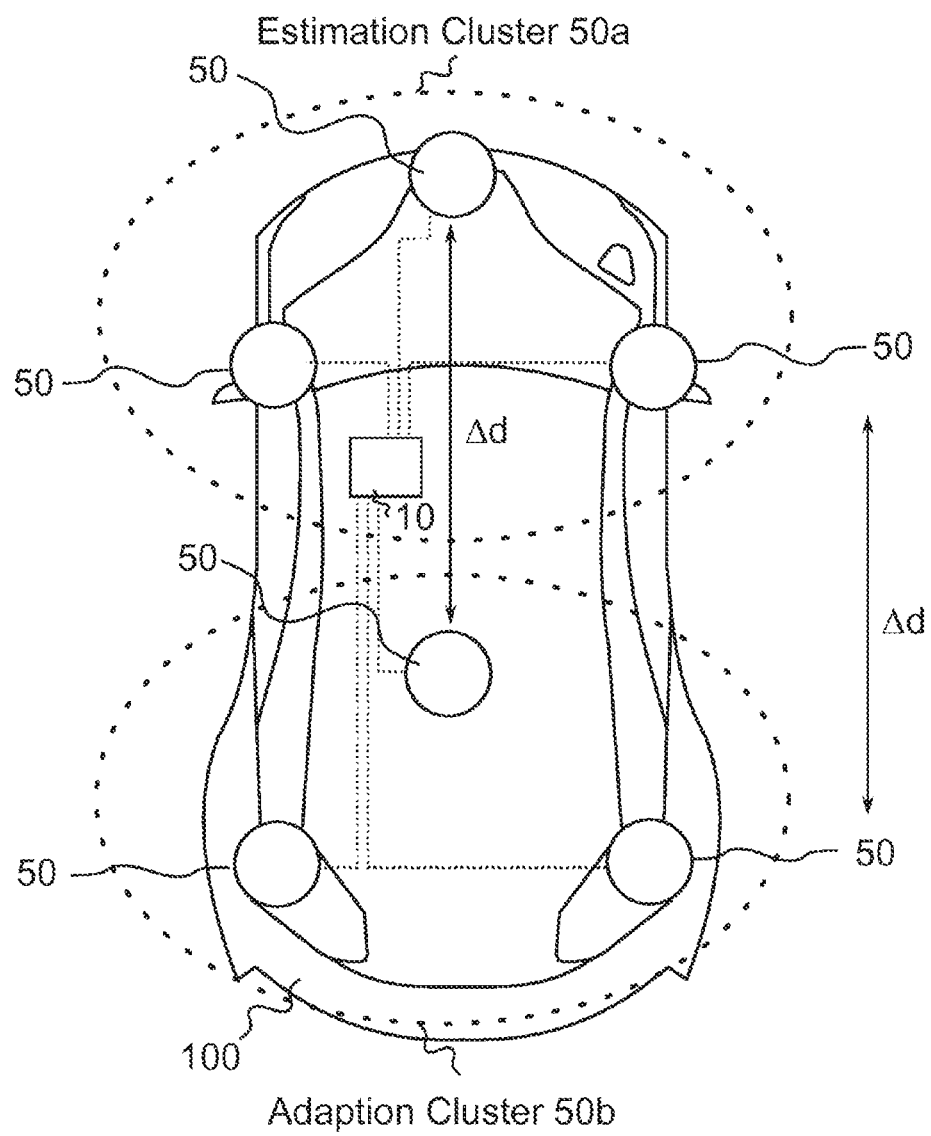
FIG. 3 shows a further illustrative embodiment of a vehicle comprising an illustrative embodiment of a transceiver.

FIG. 2 shows an illustrative embodiment of a vehicle 100 with an illustrative embodiment of a transceiver 10 according to the above description. The two clusters of antennas 50a and 50b are symbolized in FIG. 2 by one antenna each. Furthermore, it is assumed that the two clusters 50a and 50b have a distance Δd from one another. This distance can relate to two antennas in the different groups, in principle, groups having the same number of antennas and in each case the same geometric arrangement within a group are conceivable, too, wherein the distance Δd would then be present in each case between mutually corresponding antennas of the groups. FIG. 3 shows a further illustrative embodiment of a vehicle 100 with an illustrative embodiment of a transceiver 10. The illustrative embodiment of FIG. 3 shows three antennas each in the clusters 50a and 50b which have in each case the same geometric arrangement with respect to one another. The illustrative embodiment of the vehicle 100 comprises the plurality of antennas 50, the first cluster 50a of antennas comprising the same number of antennas as the second cluster 50b of antennas. In this illustrative embodiment, the antennas of the first cluster 50a have the same geometry with respect to one another as the antennas of the second cluster 50b. In addition, the antennas of the first cluster 50a have the same antenna characteristics as the antennas of the second cluster 50b. In this context, the first cluster 50a, however, comprises correspondingly different antennas from the second cluster 50b and mutually corresponding antennas have in each case the same distance from one another.

In the illustrative embodiment of FIG. 3, the first cluster 50a is used for estimating the spatial channel characteristics. The information about the radio channel corresponds, for example, to information about at least one direction of incidence of radio signals. Accordingly, the impending direction of incidence at the second cluster 50b can be inferred from the information about the direction of incidence at the first cluster 50a, with the assumption that the vehicle is moving in the direction from the second cluster 50b towards the first cluster.

The control device 16 according to FIG. 1 is then designed to determine by means of the information about the radio channel between the first cluster 50a of the antennas and the base station 20 of the mobile radio system 500 information about an estimation of a radio channel between the second cluster 50b of the antennas and the base station 20 of the mobile radio system 500. The control device 16 can be designed, for example, to determine the information about the radio channel between the second cluster 50b of the antennas and the base station 20 of the mobile radio system 500 on the basis of the assumption that at least one antenna of the first cluster 50a of antennas is arranged in a direction of travel of the vehicle 100 in front of at least one antenna of the second cluster 50b (FIG. 3 shows this geometric relationship for all antennas of the first and the second cluster 50a, 50b). If the vehicle 100 is now moving forward, i.e. in the direction from the second cluster 50b to the first cluster 50a, the second cluster 50b experiences the same radio channel as the first cluster 50a delayed in time. The control device 16 can then be designed, for example, to determine the information about the radio channel between the second cluster 50b of the antennas and the base station 20 of the mobile radio system 500 on the basis of the assumption that an antenna of the second cluster 50b of antennas experiences the same radio channel delayed in time as an antenna of the first cluster 50a.

In the illustrative embodiment shown in FIG. 3, the plurality of antennas 50 corresponds to an antenna system having decentralized and/or distributed antennas. In principle, the antennas can be distributed in any form or arrangement over the vehicle 100. In some illustrative embodiments, a central starting point for the present measures is a distributed antenna system in which a method of cooperative channel estimation can be used. An essential characteristic of a distributed antenna system is an arbitrarily spatially separated arrangement of in each case one or more antennas per site. The cooperative channel estimation can enable conclusions to be drawn with respect to the channel parameters and their influence on the message transmission by utilizing known and established methods/algorithms for channel estimation at the estimating antennas. The core characteristic of cooperative channel estimation with respect to a non-cooperative channel estimation can be the utilization of the gain in information by evaluating the spatial diversity of the distributed antenna system.

The vehicle antenna system or the plurality of antennas 50 can consist of a number of distributed individual antennas or individual antenna systems. In the illustrative embodiment of FIG. 3, division occurs into an estimation cluster (first cluster 50a) and an adaptation antenna cluster (second cluster 50b) having in each case a number of antennas. The estimation antenna cluster 50a is responsible for the cooperative channel estimation and supplies one or more relevant channel parameters such as signal-to-noise-ratio (SNR), signal-to-interference-ratio (SIR), signal-to-noise-and-interference-ratio (SINR), receive signal strength indicator (RSSI) or receive signal code power (RSCP), a bit energy Eb in a ratio to a noise power density NO, a noise power (also channel noise) and/or angle of incidence (also angle of arrival).

In a further illustrative embodiment, the control device 16 is designed to take into consideration in the determination of the information about the radio channel between the second cluster 50*b* of the antennas and the base station 20 of the mobile radio system 500 also a speed, availability information about the mobile radio system and/or a direction of travel of the vehicle 100. The control device 16 can then also be designed to determine via the one or more interfaces 12 information about the speed, the availability information about the mobile radio system and/or the direction of travel of the vehicle 100. In this context, the availability information can comprise, for example, information about a current traffic situation (real-time traffic information), information about availability maps of the mobile radio system, information about a network map of the mobile radio system (e.g. cell distribution, frequency distribution, distribution/availability of cells of other systems), etc.

By the linking and statistical evaluation of a number of sensor data (sensor fusion) such as, e.g. speed and direction of travel and taking into consideration cooperative availability data, a number of input variables are taken into consideration in the channel estimation in order to be able to make more precise predictions about the channel characteristics (e.g. anticipation of channel or frequency, system availability etc.). The spatial separation of the two clusters 50*a*, 50*b* generates in this illustrative embodiment a time advantage which can be utilized additionally in the channel estimation. Thus, this method can also be used for highly mobile scenarios which can be subject to fast changes in the channel parameters. A central control unit (CU) as implementation of the control device 16 interprets the present data, exchanges information with the autonomous remote radio heads and, if necessary, provides for an antenna change in the adaptation antenna cluster or of the second cluster 50*b*.

Figure 4:
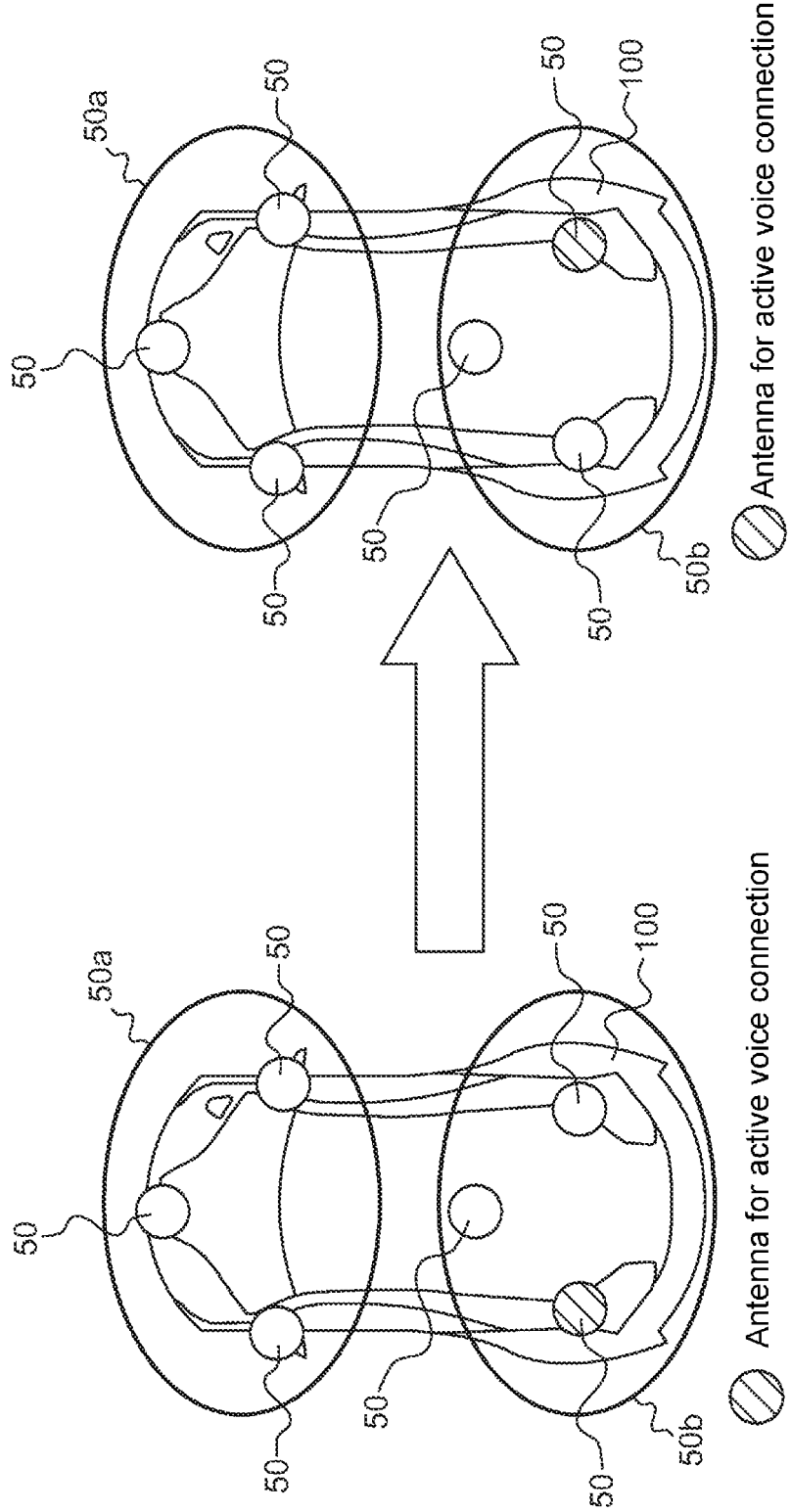
FIG. 4 shows an illustrative embodiment of a vehicle comprising an illustrative embodiment of a transceiver with adaptive antenna selection.

In further illustrative embodiment, the control device 16 is designed to adaptively match a selection of antennas from the plurality of antennas 50 for the first and second cluster 50*a*, 50*b* of antennas. As already explained above, the control device 16 can be designed to select the first cluster 50*a* of antennas on the basis of a direction of travel of the vehicle 100 in such a way that at least one antenna of the first cluster 50*a* is arranged in front of at least one antenna of the second cluster 50*b* in the direction of travel of the vehicle 100. In addition, the control device 16 can be designed to adaptively match a number of antennas in the first cluster 50*a* and/or in the second cluster 50*b* of antennas. FIG. 4 shows an illustrative embodiment of a vehicle 100 with an illustrative embodiment of a transceiver 10 with adaptive antenna selection. FIG. 4 shows a temporal sequence of an antenna selection for the second cluster 50*b* of a vehicle 100. In this illustrative embodiment, the vehicle has six antennas, the front three antennas being selected for the first cluster 50*a*. It is also assumed that a voice link exists which is operated via the second cluster 50*b*. In the left-hand scenario, the antenna on the left at the rear is selected for the voice link whereas the antenna on the right at the rear is selected in the right-hand scenario. The basis for this selection is formed by a channel estimation about the antennas of the first cluster 50*a*.

In illustrative embodiments, an improved or even the best possible performance and reliability can be guaranteed for the message transmission, for example as part of a telephone call. It may even be possible to prevent the termination of a connection. In addition, the method of adaptive beam forming can be utilized in the adaptation antenna cluster 50*b* in order to align the radiation characteristic of the active antenna 50*b* ideally with the base station 20. Some illustrative embodiments can bring about an increase in performance in the sense of the maximum possible data rate and reliability and, under certain circumstances improve a quality of service or even provide a best quality of service (QoS) of the message transmission. Illustrative embodiments can also be applied in highly mobile scenarios.

Figure 5:
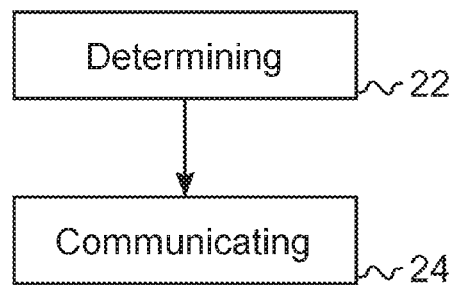
FIG. 5 shows a block diagram of an illustrative embodiment of a method for a transceiver.

FIG. 5 shows a block diagram of an illustrative embodiment of a method for a transceiver 10 for a vehicle 100 for communication in a mobile radio system 500. The method comprises determining 22 a information about a radio channel between the transceiver 10 and a base station 20 of the mobile radio system 500 via a first cluster 50*a* of a plurality of antennas 50. The method also comprises communicating 24 with the base station 20 of the mobile radio system 500 via a second cluster 50*b* of the plurality of antennas 50.

A further illustrative embodiment is a computer program for carrying out at least one of the methods described above when the computer program is run on a computer, a processor or a programmable hardware component. A further illustrative embodiment is also a digital storage medium which is machine- or computer-readable and which has electronically readable control signals which can interact with a programmable hardware component in such a way that one of the methods described above is carried out.

The features disclosed in the above description, the subsequent claims and the attached figures can be of significance and implemented both individually and in arbitrary combination for implementing an illustrative embodiment in its various designs.

Although some aspects have been described in conjunction with a device, these aspects, naturally, also represent a description of the corresponding method so that a block or a component of a device has to be understood to be also a corresponding method step or a feature of a method step. Analogously therewith, aspects which have been described in conjunction with a method step or as a method step also represent a description of a corresponding block or detail or feature of a corresponding device.

Depending on certain requirements for implementation, illustrative embodiments of the invention can be implemented in hardware or in software. The implementation can be carried out by using a digital storage medium, for example a floppy disk, a DVD, a Blu-ray disk, a CD, a ROM, a PROM, an EPROM, an EEPROM or a FLASH memory, a hard disk or another magnetic or optical memory on which electronically readable control signals are stored which interact or can interact with a programmable hardware component in such a manner that the respective method is carried out.

A programmable hardware component can be formed by a processor, a computer processor (CPU=Central Processing Unit), a graphics processor (GPU=Graphics Processing Unit), a computer, a computer system, an application-specific integrated circuit (ASIC), an integrated circuit (IC), a one-chip system (SOC=System on Chip), a programmable logic element or a field-programmable gate array with a microprocessor (FPGA).

The digital storage medium can, therefore, be machine- or computer-readable. Some illustrative embodiments, therefore, comprise a data medium which has electronically readable control signals which are able to interact with a programmable computer system or a programmable hardware component in such a manner that one of the methods described herein is performed. An illustrative embodiment is thus a data medium (or a digital storage medium or a computer-readable medium) on which the program for carrying out one of the methods described herein is recorded.

In general, illustrative embodiments of the present invention can be implemented as program, firmware, computer program or computer program product having a program code or as data, the program code or the data being effective to the extent of carrying out one of the methods if the program is run on a processor or a programmable hardware component. The program code or the data can be stored, for example, also on a machine-readable medium or data medium. The program code or the data can be present as, among other things, source code, machine code or byte code as well as other intermediate code.

A further illustrative embodiment is also a data stream, a signal sequence or a sequence of signals which represents or represent the program for carrying out one of the methods described herein. The data stream, the signal sequence or the sequence of signals can be configured, for example, in order to be transferred via a data communication link, for example via the Internet or another network. Illustrative embodiments are thus also data-representing signal sequences that are suitable for a transmission via a network or a data communication link, the data representing the program.

A program according to an illustrative embodiment can implement one of the methods during its execution, for example by the fact that it reads out storage locations or writes into these a data item or a number of data by which means, if necessary, switching processes or other processes are caused in transistor structures, in amplifier structures or in other electrical, optical or magnetic components or components operating in accordance with another functional principle are produced. Correspondingly, data, values, sensor values or other information items can be detected, determined or measured by a program by reading out from a storage location. A program can therefore detect, determine or measure quantities, values, measurement variables and other information items by reading out one or more storage locations and effect, initiate or perform an action by writing into one or more storage locations and activate other devices, machines and components.

The illustrative embodiments described above only represent an illustration of the principles of the present invention. Naturally, modifications and variations of the arrangements and details described herein will be obvious to other experts. It is intended, therefore, that the invention should be restricted only by the scope of protection of the subsequent patent claims and not by the specific details which have been presented herein by means of the description and the explanation of the illustrative embodiments.

LIST OF REFERENCE DESIGNATIONS

10 Transceiver
12 One or more interfaces
14 Transceiving device
16 Control device
20 Base station
22 Determining
24 Communicating
50 Plurality of antennas
50a First cluster of antennas
50b Second cluster of antennas
100 Vehicle
500 Mobile radio system The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A transceiver for a vehicle for communication in a mobile radio system, comprising:
   one or more interfaces for a plurality of antennas;
   a transceiving device configured to communicate via the one or more interfaces and via at least a part of the plurality of antennas in the mobile radio system; and
   a control device configured to control the transceiving device and the one or more interfaces, wherein the control device is configured to:
      determine, via a first cluster of the plurality of antennas, information about a radio channel between the first cluster of antennas and a base station of the mobile radio system, and
      communicate via a second cluster of the plurality of antennas with the base station of the mobile radio system,
      determine, using the information about the radio channel between the first cluster of the antennas and the base station, information about a radio channel between the second cluster of the antennas and the base station, and
      select a particular antenna, from among the second cluster of antennas, to use to communicate with the base station based on the determined information about the radio channel between the second cluster of the antennas and the base station, and based on a direction of travel of the vehicle.

2. The transceiver as claimed in claim 1,
   wherein the plurality of antennas comprises antennas having at least one of different orientations, different polarizations, different mounting locations on the vehicle, different antenna gains and different radiation characteristics,
   wherein the plurality of antennas corresponds to an antenna system having at least one of decentralized and distributed antennas.

3. The transceiver as claimed in claim 1,
   wherein the information about the radio channel comprises information about at least one direction of incidence of radio signals.

4. The transceiver as claimed in claim 1,
   wherein the control device is configured to determine the information about the radio channel between the second cluster of the antennas and the base station of the mobile radio system based on at least one of: a speed, availability information about the mobile radio system, and the direction of travel of the vehicle.

5. The transceiver as claimed in claim 4, wherein the control device is configured to determine, via the one or more interfaces, information about the at least one of the speed, availability information about the mobile radio system, and the direction of travel of the vehicle.

6. The transceiver as claimed in claim 1, wherein the control device is configured to determine the information about the radio channel between the second cluster of the antennas and the base station of the mobile radio system based on at least one of:
   (i) an assumption that at least one antenna of the first cluster of antennas is arranged in the direction of travel of the vehicle in front of at least one antenna of the second cluster, and
   (ii) an assumption that an antenna of the second cluster of antennas experiences the same radio channel as an antenna of the first cluster delayed in time.

7. The transceiver as claimed in claim 6, wherein the control device is configured to select the first cluster of antennas based on the direction of travel of the vehicle such that at least one antenna of the first cluster is arranged in front of at least one antenna of the second cluster in the direction of travel of the vehicle.

8. The transceiver as claimed in claim 1, wherein the control device is configured to adaptively match a selection of antennas from the plurality of antennas for the first and the second cluster of antennas.

9. The transceiver as claimed in claim 1, wherein the control device is configured to adaptively match a number of antennas in at least one of the first cluster and in the second cluster of antennas.

10. The transceiver as claimed in claim 1, wherein the transceiving device comprises two or more transceiving modules coupled to the plurality of antennas.

11. The transceiver as claimed in claim 1, wherein the control device is configured to perform beam forming with respect to the base station of the mobile radio system via the antennas in the second cluster.

12. The transceiver as claimed in claim 11, wherein the control device is configured to adaptively match a beam forming via the antennas in the second cluster.

13. The transceiver as claimed in claim 1, wherein the control device is further configured to change the particular antenna, from among the second cluster of antennas, to use to communicate with the base station based on the determined information about the radio channel between the second cluster of the antennas and the base station.

14. A vehicle having a transceiver, wherein the transceiver comprises:
   one or more interfaces for a plurality of antennas;
   a transceiving device configured to communicate via the one or more interfaces and via at least a part of the plurality of antennas in the mobile radio system; and
   a control device configured to control the transceiving device and the one or more interfaces, wherein the control device is configured to:
      determine, via a first cluster of the plurality of antennas, information about a radio channel between the first cluster of antennas and a base station of the mobile radio system, and
      communicate via a second cluster of the plurality of antennas with the base station of the mobile radio system,
      determine, using the information about the radio channel between the first cluster of the antennas and the base station, information about a radio channel between the second cluster of the antennas and the base station, and
      select a particular antenna, from among the second cluster of antennas, to use to communicate with the base station based on the determined information about the radio channel between the second cluster of the antennas and the base station, and based on a direction of travel of the vehicle.

15. The vehicle as claimed in claim 14 further comprising the plurality of antennas, wherein the first cluster of antennas comprises the same number of antennas as the second cluster of antennas.

16. The vehicle as claimed in claim 15, wherein the antennas of the first cluster have the same geometry with respect to one another as the antennas of the second cluster.

17. The vehicle as claimed in claim 15, wherein the antennas of the first cluster have the same antenna characteristic as the antennas of the second cluster.

18. The vehicle as claimed in claim 15, wherein the first cluster comprises other antennas than the second cluster.

19. The vehicle as claimed in claim 14, wherein the control device is further configured to change the particular antenna, from among the second cluster of antennas, to use to communicate with the base station based on the determined information about the radio channel between the second cluster of the antennas and the base station.

20. A method for a transceiver for a vehicle for communication in a mobile radio system, comprising the acts of:
   determining information about a radio channel between a first cluster of antennas of a plurality of antennas and a base station of the mobile radio system; and
   communicating with the base station of the mobile radio system via a second cluster of the plurality of antennas
   determining, using the information about the radio channel between the first cluster of the antennas and the base station, information about a radio channel between the second cluster of the antennas and the base station, and
   selecting a particular antenna, from among the second cluster of antennas, to use to communicate with the base station based on the determined information about the radio channel between the second cluster of the antennas and the base station, and based on a direction of travel of the vehicle.

* * * * *